United States Patent
Li et al.

(10) Patent No.: US 12,308,653 B2
(45) Date of Patent: May 20, 2025

(54) ENERGY STORAGE SYSTEM, PHYSICAL POSITION IDENTIFICATION METHOD, AND PHOTOVOLTAIC POWER GENERATION SYSTEM

(71) Applicant: Huawei Digital Power Technologies Co., Ltd., Shenzhen (CN)

(72) Inventors: Jianpeng Li, Dongguan (CN); Yuxiang Li, Xi'an (CN); Zhenghua Zou, Dongguan (CN); Huibin Hao, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 54 days.

(21) Appl. No.: 17/825,835

(22) Filed: May 26, 2022

(65) Prior Publication Data

US 2022/0393475 A1 Dec. 8, 2022

(30) Foreign Application Priority Data

May 27, 2021 (CN) .......................... 202110585053.4

(51) Int. Cl.
*H02J 3/38* (2006.01)
*H02J 7/00* (2006.01)
(Continued)

(52) U.S. Cl.
CPC ............ *H02J 3/381* (2013.01); *H02J 7/0013* (2013.01); *H02J 7/007* (2013.01);
(Continued)

(58) Field of Classification Search
CPC .......... H02J 3/381; H02J 7/0013; H02J 7/007; H02J 2207/20; H02J 2300/24; H02J 3/32;
(Continued)

(56) References Cited

U.S. PATENT DOCUMENTS 8,907,624 B2 * 12/2014 Kumagai ............ H02J 7/00306
320/116
10,326,284 B2 * 6/2019 Long ...................... H02J 7/0013
(Continued)

FOREIGN PATENT DOCUMENTS

CN 102110860 B 4/2013

*Primary Examiner* — Daniel Cavallari
*Assistant Examiner* — Brian K Baxter
(74) *Attorney, Agent, or Firm* — Rimon PC

(57) ABSTRACT

An energy storage system includes at least one energy storage container, and the energy storage container includes a battery management system and m battery clusters. According to a rapid spanning tree protocol (RSTP) and a known physical position of a second controller, a first controller determines physical positions of remaining second controllers. A plurality of third controllers corresponding to n battery packs in each battery cluster determine a first third controller and set a physical position of the first third controller as a first physical position. An $i^{th}$ third controller in the plurality of third controllers determines a physical position of the $i^{th}$ third controller based on a position signal sent by an $(i-1)^{th}$ third controller, where $i=2, 3, \ldots,$ or $n$.

14 Claims, 9 Drawing Sheets

(51) Int. Cl.
*H04L 12/40* (2006.01)
*H04L 12/46* (2006.01)

(52) U.S. Cl.
CPC ...... *H04L 12/40169* (2013.01); *H04L 12/462* (2013.01); *H02J 2207/20* (2020.01); *H02J 2300/24* (2020.01); *H04L 2012/40215* (2013.01)

(58) Field of Classification Search
CPC .......... H02J 7/00032; H04L 12/40169; H04L 12/462; H04L 2012/40215
USPC ............................................................ 702/63
See application file for complete search history.

(56) References Cited

U.S. PATENT DOCUMENTS

| | | | | |
|---|---|---|---|---|
| 10,938,221 B1* | 3/2021 | Tenorio | ................. | H02J 7/0014 |
| 11,245,268 B1* | 2/2022 | Trippel | ................. | H02J 7/0042 |
| 11,404,885 B1* | 8/2022 | Tenorio | ............. | H01M 10/4257 |
| 11,411,407 B1* | 8/2022 | Tenorio | ................. | H02J 7/0047 |
| 11,476,677 B2* | 10/2022 | Liu | ................... | H01M 10/4257 |
| 11,489,343 B2* | 11/2022 | Liu | ..................... | H02J 7/00304 |
| 11,552,479 B2* | 1/2023 | Liu | ....................... | H02J 7/0063 |
| 11,588,334 B2* | 2/2023 | Tenorio | ............. | H01M 10/4257 |
| 11,594,892 B2* | 2/2023 | Liu | ......................... | H02J 7/007 |
| 2009/0091332 A1* | 4/2009 | Emori | .................. | H02J 7/0018 |
| | | | | 324/537 |
| 2010/0262312 A1* | 10/2010 | Kubota | .................... | H02J 7/35 |
| | | | | 713/340 |
| 2014/0084689 A1* | 3/2014 | Jung | ........................ | H02J 7/34 |
| | | | | 307/43 |
| 2014/0358375 A1* | 12/2014 | Sakai | .................... | B62D 5/049 |
| | | | | 701/1 |
| 2016/0359329 A1* | 12/2016 | Kim | ................... | H01M 10/425 |
| 2017/0126032 A1* | 5/2017 | Beaston | ............... | H02J 7/0016 |
| 2019/0227863 A1* | 7/2019 | Cho | .................. | G01R 31/371 |
| 2019/0305551 A1* | 10/2019 | Ley | .................. | H02J 13/00028 |
| 2021/0083968 A1* | 3/2021 | Diehl | ..................... | H04W 84/18 |
| 2021/0143648 A1* | 5/2021 | Yeom | ..................... | H02J 7/0047 |
| 2021/0376635 A1* | 12/2021 | Luangrath | ............ | H02J 7/0045 |
| 2022/0121260 A1* | 4/2022 | King | ........................ | G06F 1/28 |
| 2022/0255322 A1* | 8/2022 | Jiang | ........................ | H02J 3/42 |
| 2022/0302724 A1* | 9/2022 | Sharma | ..................... | H02J 3/32 |
| 2022/0311252 A1* | 9/2022 | Zou | .................. | H02J 7/007182 |
| 2022/0344947 A1* | 10/2022 | Wu | ........................ | H02M 7/49 |

* cited by examiner

ENERGY STORAGE SYSTEM, PHYSICAL POSITION IDENTIFICATION METHOD, AND PHOTOVOLTAIC POWER GENERATION SYSTEM

CROSS-REFERENCE TO RELATED APPLICATION

This application claims priority to Chinese Patent Application No. 202110585053.4, filed on May 27, 2021, which is hereby incorporated by reference in its entirety.

TECHNICAL FIELD

This application relates to the field of energy storage systems, and in particular, to an energy storage system, a physical position identification method, and a photovoltaic power generation system.

BACKGROUND

For an energy storage system in which an electrochemical battery is used, a battery management system (BMS) needs to be set to monitor data such as a voltage, a current, and a temperature of the energy storage system, to implement charging and discharging management. A current energy storage system mainly uses a distributed battery management system.

The energy storage system usually includes a plurality of energy storage containers. A distributed battery management system in each energy storage container includes controllers of a plurality of levels, to improve efficiency. The controllers of a plurality of levels may communicate with each other, and a quantity of lower-level controllers is greater than that of upper-level controllers. As a capacity of a current energy storage container increases, a quantity of batteries in the energy storage container keeps increasing, and a total quantity of controllers in a battery management system keeps increasing. Therefore, to facilitate management and maintenance, a physical position of a controller needs to be quickly located. Currently, a method mainly adopted is: adding a dual in-line package switch for each controller, adjusting a quantity of bits of the dual in-line package switch, and setting a physical position for each controller through binary encoding. However, according to this method, each controller needs to be separately set, and a misoperation is likely to occur in processes of production, assembly, delivery, and spare part replacement. Therefore, security and reliability of the battery management system are reduced.

SUMMARY

To resolve the foregoing problems, this application provides an energy storage system, a physical position identification method of a battery management system, and a photovoltaic power generation system, to avoid a misoperation when a physical position of a controller is identified, and accordingly, improve security and reliability of the battery management system.

According to a first aspect, this application provides an energy storage system. The energy storage system includes at least one energy storage container, and the energy storage container includes a battery management system and m battery clusters. Each battery cluster includes n battery packs connected in series, each battery pack includes a plurality of batteries, and the batteries in the battery pack may be connected in series or in series and parallel. The battery management system includes a first controller, m second controllers, and m*n third controllers, where m and n are integers greater than 1. Each third controller is configured to manage one corresponding battery pack, each second controller is configured to manage one corresponding battery cluster, and the first controller is configured to manage the energy storage container. Third controllers corresponding to the n battery packs in each battery cluster are connected in series through a controller area network (CAN) bus, so that data communication between a second controller and a third controller is strong in time validity. Each second controller is connected to the third controllers corresponding to the n battery packs in the corresponding battery cluster through the CAN bus. The third controllers corresponding to the n battery packs in each battery cluster are configured to determine a physical position of a first third controller in a serial connection. An $i^{th}$ third controller in the third controllers corresponding to the n battery packs in each battery cluster determines a physical position of the $i^{th}$ third controller based on a position signal sent by an $(i-1)^{th}$ third controller, where $i=2, 3, \ldots,$ or n.

The battery management system of the energy storage system uses an architecture with three levels of controllers. The third controllers corresponding to the n battery packs in one battery cluster are connected in series, and a physical position of a first third controller is determined, for example, the physical position of the first third controller is set to a first physical position. A previous third controller sends a position signal to a next third controller, and the next third controller determines its physical position based on the obtained position signal. In the solutions of this application, a hardware label does not need to be set, and a misoperation can be avoided when a physical position of a controller is identified, efficiency is improved, and security and reliability of the battery management system are improved.

In a possible implementation, the first controller is connected to the m second controllers through an Ethernet ring network, and the first controller determines physical positions of the remaining second controllers according to a rapid spanning tree protocol (RSTP) and a known physical position of a second controller.

The first controller determines, according to the RSTP, a binary tree representing a relative position of a second controller, and then the first controller converts the relative position into an actual physical position of the second controller based on a known physical position of any second controller, to further determine the physical positions of the remaining second controllers. A hardware label does not need to be set, and a misoperation is avoided when a physical position of a controller is identified, efficiency is improved, and security and reliability of the battery management system are improved.

In a possible implementation, each third controller includes a digital signal input (DI) interface and a digital signal output (DO) interface. When the third controllers corresponding to the n battery packs in each battery cluster are connected in series, a DI interface of the first third controller is suspended, a DO interface of an $n^{th}$ third controller is suspended, and a DI interface of the $i^{th}$ third controller is connected to a DO interface of the $(i-1)^{th}$ third controller.

Each third controller is configured as follows: When a DI interface of a third controller is suspended, a DI interface is at a high level, that is, the third controller detects the high level, and when the DI interface of the third controller is connected to a DO interface of a previous third controller, the DO interface is at a low level, that is, the third controller detects the low level.

In a possible implementation, when determining that the DI interface of the third controller is suspended, the third controller determines that the third controller is the first third controller. That is, when determining that a level of the DI interface of the third controller is a high level, the third controller determines that the third controller is the first third controller.

In a possible implementation, the position signal is a pulse signal. The (i−1)th third controller in the third controllers corresponding to the n battery packs in each battery cluster is configured to determine a quantity of pulses in the position signal based on a physical position of the (i−1)th third controller, to generate the position signal used to indicate the physical position of the ith third controller, and send the position signal to the ith third controller. The ith third controller in the third controllers corresponding to the n battery packs in each battery cluster is configured to determine the physical position of the ith third controller based on the quantity of pulses included in the received position signal.

For other third controllers, except the first third controller and the last third controller that are connected in series, a received position signal represents a physical position of a third controller, and a sent position signal represents a physical position of a next third controller connected in series.

In a possible implementation, a third controller is further configured to store first information representing the physical position of the third controller, and send the first information to a second controller in a battery cluster in which a corresponding battery pack is located, so that the second controller determines the physical position of each third controller, and the second controller may further send the first information to the first controller.

In a possible implementation, ground terminals of the third controllers corresponding to the n battery packs in each battery cluster are not connected to each other, and the DI interface of the $i^{th}$ third controller is connected to the DO interface of the $(i-1)^{th}$ third controller by using an optical coupler. Therefore, signal isolation output between the third controllers is implemented.

In a possible implementation, the first controller is a root bridge node, a bridge ID of the first controller is a first ID, a bridge ID of the second controller is a second ID, and the second ID is greater than the first ID.

Because the energy storage container includes one first controller, and a physical position of the first controller is determined, the solution of this embodiment of this application sets the first controller as a root bridge node, and the second controller is a non-root bridge node.

In a possible implementation, the first controller is configured to: determine relative positions of the second controllers in the Ethernet ring network according to the RSTP, and determine physical positions of remaining second controllers in the Ethernet ring network based on a known physical position and a relative position of a second controller. In some embodiments, the controller that is electrically connected is a second controller that is directly connected to the first controller.

In a possible implementation, the first controller and a second controller in the corresponding battery cluster are electrically connected in one of the following manners: an RS-485 serial bus standard or input/output connection manner. The first controller is further configured to determine a physical position of the second controller that is electrically connected.

In a possible implementation, the first controller stores second information, and the second information represents a physical position of the second controller directly connected to the first controller. In this case, the first controller may determine, based on MAC addresses of two second controllers connected to the first controller, a physical position of one of the second controllers.

According to a second aspect, this application further provides an energy storage system. The energy storage system includes at least one energy storage container, and the energy storage container includes a battery management system and m battery clusters. Each battery cluster includes n battery packs connected in series, and the battery management system includes a first controller, m second controllers, and m*n third controllers, where m and n are integers greater than 1. The first controller is connected to the m second controllers through an Ethernet ring network. The first controller is configured to manage the energy storage container, each second controller is configured to manage one corresponding battery cluster, and each third controller is configured to manage one corresponding battery pack. The first controller is configured to determine physical positions of remaining second controllers according to a rapid spanning tree protocol (RSTP) and a known physical position of a second controller.

In the solution provided in this application, the first controller determines, according to the RSTP, a binary tree representing a relative position of a second controller, and then the first controller converts the relative position into an actual physical position of the second controller based on a known physical position of any second controller, to further determine the physical positions of the remaining second controllers. A hardware label does not need to be set, and a misoperation is avoided when a physical position of a controller is identified, efficiency is improved, and security and reliability of the battery management system are improved.

In a possible implementation, each second controller is connected to third controllers corresponding to the n battery packs in a corresponding battery cluster through a controller area network (CAN) bus, and the third controllers corresponding to the n battery packs in each battery cluster are connected in series through the CAN bus. The third controllers corresponding to the n battery packs in each battery cluster are configured to determine a physical position of a first third controller connected in series. An $i^{th}$ third controller in the third controllers corresponding to the n battery packs in each battery cluster determines a physical position of the $i^{th}$ third controller based on a position signal sent by an $(i-1)^{th}$ third controller, where i=2, 3, . . . , or n.

According to the solution provided in this application, the third controllers corresponding to n battery packs in one battery cluster are connected in series, and the physical position of the first third controller connected in series is determined, for example, the physical position of the first third controller is set to a first physical position. A previous third controller connected in series sends a position signal to a next third controller, and the next third controller determines a physical position of the next third controller based on the obtained position signal, to determine a physical position of a third controller. In the solution of this application, a hardware label does not need to be set, and a misoperation is avoided when a physical position of a controller is identified, efficiency is improved, and security and reliability of the battery management system are improved.

According to a third aspect, this application further provides a physical position identification method of a battery management system of an energy storage system. The method is applied to the energy storage system provided in the foregoing implementations, and the method includes:

determining a first third controller connected in series in third controllers corresponding to n battery packs in each battery cluster, and setting a physical position of a first third controller as a first physical position; and determining a physical position of an $i^{th}$ third controller based on a position signal sent by an $(i-1)^{th}$ third controller of the third controllers corresponding to the n battery packs in each battery cluster, where i=2, 3, ..., or n.

According to the method provided in this application, the third controllers corresponding to n battery packs in one battery cluster are connected in series, and the physical position of the first third controller connected in series is determined, for example, the physical position of the first third controller is set to the first physical position. A previous third controller connected in series sends a position signal to a next third controller, and the next third controller determines a physical position of the next third controller based on the obtained position signal, to determine a physical position of a third controller. In the method, a hardware label does not need to be set, and a misoperation is avoided when a physical position of a controller is identified, efficiency is improved, and security and reliability of the battery management system are improved.

In a possible implementation, the first controller is connected to m second controllers through an Ethernet ring network, and the method further includes: determining physical positions of remaining second controllers according to a rapid spanning tree protocol (RSTP) and a known physical position of a second controller.

In a possible implementation, the position signal is a pulse signal, and a quantity of pulses included in the pulse signal is used to indicate a physical position of a next third controller connected in series. The determining a physical position of an $i^{th}$ third controller based on a position signal sent by an $(i-1)^{th}$ third controller of the third controllers corresponding to the n battery packs in each battery cluster specifically includes:

determining, based on a quantity of pulses included in the received position signal, the physical position of the $i^{th}$ third controller in the third controllers corresponding to the n battery packs in each battery cluster, generating, based on a physical position of the $(i-1)^{th}$ third controller in the third controllers corresponding to the n battery packs in each battery cluster, the position signal used to indicate the physical position of the $i^{th}$ third controller, and sending the position signal to the $i^{th}$ third controller.

In a possible implementation, before the determining physical positions of remaining second controllers according to a rapid spanning tree protocol (RSTP) and a known physical position of a second controller, the method further includes:

setting the first controller as a root bridge, a bridge ID of the first controller is a first ID, a bridge ID of the second controller is a second ID, and the second ID is greater than the first ID.

In a possible implementation, the determining physical positions of remaining second controllers according to a rapid spanning tree protocol (RSTP) and a known physical position of a second controller specifically includes:

determining relative positions of the second controllers according to the RSTP, and determining physical positions of the second controllers based on a known physical position and a relative position of a second controller.

In a possible implementation, the first controller and a second controller in the corresponding battery cluster are electrically connected in one of the following manners: an RS-485 serial bus standard or input/output connection manner, and the method further includes: determining a physical position of the second controller that is electrically connected.

In a possible implementation, the method further includes: determining, based on second information, a physical position of a second controller directly connected to the first controller, where the second information is prestored.

According to a fourth aspect, this application further provides a physical position identification method of a battery management system of an energy storage system. The method is applied to the energy storage system provided in the foregoing implementations, a first controller of the energy storage system is connected to m second controllers through an Ethernet ring network, and the method includes:

determining physical positions of remaining second controllers according to a rapid spanning tree protocol (RSTP) and a known physical position of a second controller.

In a possible implementation, each second controller is connected to third controllers corresponding to n battery packs in a corresponding battery cluster through a controller area network (CAN) bus, and the third controllers corresponding to the n battery packs in each battery cluster are connected in series through the CAN bus. The method further includes: determining a first third controller connected in series in the third controllers corresponding to the n battery packs in each battery cluster, and setting a physical position of a first third controller as a first physical position; and determining a physical position of an third controller based on a position signal sent by an $(i-1)^{th}$ third controller of the third controllers corresponding to the n battery packs in each battery cluster, where i=2, 3, ..., or n.

According to a fifth aspect, this application further provides a photovoltaic power generation system, including the energy storage system provided in the foregoing implementations, and further including a photovoltaic module, a photovoltaic inverter, and an alternating current bus. An input end of the photovoltaic inverter is connected to the photovoltaic module, and an output end of the photovoltaic inverter is connected to an alternating current bus. The alternating current bus is used to connect the energy storage system and an alternating current network. The photovoltaic module converts photovoltaic energy into a direct current and then transmits the direct current to the photovoltaic inverter. The photovoltaic inverter converts the direct current into an alternating current and then transmits the alternating current to the alternating current network through the alternating current bus, or charges the energy storage system.

DESCRIPTION OF EMBODIMENTS

To make a person skilled in the art better understand technical solutions provided in embodiments of this application, the following first describes an application scenario of the technical solutions of this application.

Figure 1A:
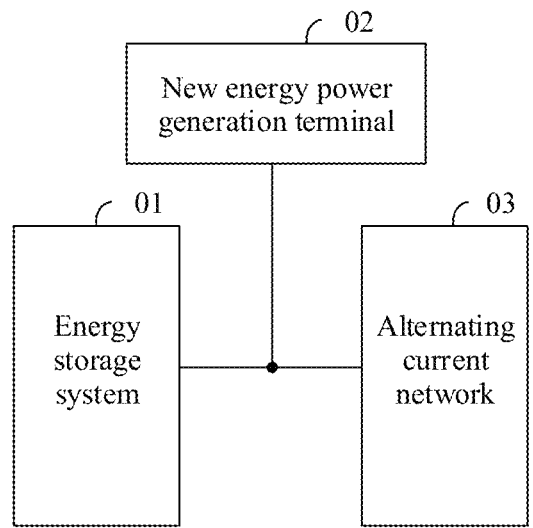
FIG. 1A is a schematic diagram of a schematic new energy power generation system according to this application.

FIG. 1A is a schematic diagram of a schematic new energy power generation system according to this application.

New energy power generation terminals 02 such as a photovoltaic power generation terminal and a wind power generation terminal are characterized by volatility and uncertainty, and fluctuations in their power generation amounts may affect a stability of an alternating current network 03. To solve the foregoing problems, an energy storage system 01 is added to the new energy power generation system.

When an alternating current output by the new energy power generation terminal 02 is higher than power demand of the alternating current network 03, excess power is stored in the energy storage system 01. When an alternating current output by the new energy power generation terminal 02 is lower than power demand of the alternating current network 03, the energy storage system 01 supplies power to the alternating current network 03, so that the alternating current network 03 becomes stable.

The energy storage system 01 may include a plurality of energy storage containers, each energy storage container includes a plurality of battery clusters, each battery cluster includes a plurality of battery packs, and each battery pack includes a plurality of batteries. In order to efficiently manage the batteries in the energy storage container, a battery management system of the energy storage container usually includes controllers of a plurality of levels, an upper-level controller in the controllers of a plurality of levels can send a control instruction to a lower-level controller, and a quantity of lower-level controllers is greater than that of upper-level controllers.

As a capacity of the energy storage container increases, a quantity of batteries in the energy storage container keeps increasing, and a quantity of controllers in the battery management system also increases accordingly. To facilitate management and maintenance of controllers, fast positioning needs to be implemented for a physical position of a controller. Currently, a dual in-line package switch is added for each controller. Specifically, each controller corresponds to one dual in-line package switch, and a quantity of bits of the dual in-line package switch is adjusted, that is, physical positions are allocated according to a physical connection relationship of the controllers through binary encoding. During physical position positioning, a pin signal of the dual in-line package switch is collected, which is usually a level signal. Corresponding binary code is determined based on the collected level signal, and a physical position of a controller is further determined. This method is implemented by hardware, and requires production or on-site assembly personnel to perform a dialing operation. In addition, spare part replacement also needs to be set. For example, when a BMS of an energy storage container includes 132 controllers, 132 settings need to be manually performed. It is clear that the foregoing method increases an operation difficulty of the on-site personnel, and a misoperation is likely to occur. Therefore, security and reliability of the battery management system is reduced.

Figure 1B:
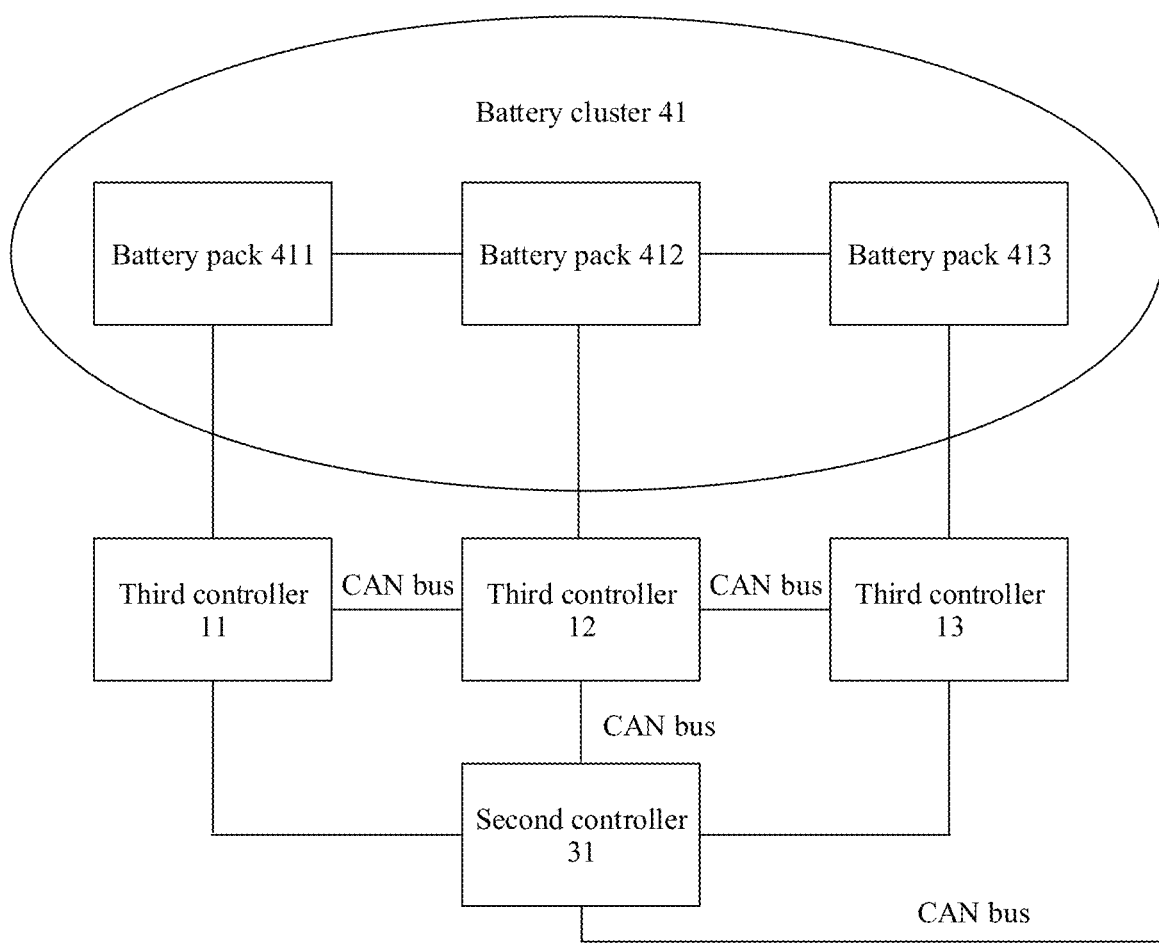
FIG. 1B is a schematic diagram of a battery management system according to an embodiment of this application.

To resolve the foregoing technical problems, this application provides an energy storage system, a physical position identification method of a battery management system, and a photovoltaic power generation system, applied to a battery management system that uses a three-layer controller architecture. A first controller is configured to manage the energy storage container, each second controller is configured to manage a corresponding battery cluster, and each third controller is configured to manage a corresponding battery pack. Each second controller is connected to a corresponding third controller through a CAN bus, a third controller corresponding to each battery pack in each battery cluster is connected in series through the CAN bus, a previous third controller connected in series sends a position signal to a next third controller, and the next third controller determines its own physical position based on the obtained position signal. As shown in FIG. 1B, a second controller 31 is configured to manage a battery cluster 41, where the battery cluster 41 includes a battery pack 411, a battery pack 412, and a battery pack 413. A third controller 11 is configured to manage the battery pack 411, a third controller 12 is configured to manage the battery pack 412, and a third controller 13 is configured to manage the battery pack 413. The second controller 31 is connected to the third controllers 11 to 13 through a CAN bus, and the third controllers 11 to 13 are also connected in series through CAN bus. The first controller is connected with each second controller through an Ethernet ring network. The first controller determines the physical positions of second controllers according to a rapid spanning tree protocol (RSTP), so that a misoperation is avoided when a physical position of the battery management system is identified, to improve security and reliability of the energy storage system.

The following describes the technical solutions of this application with reference to the accompanying drawings.

In the following description of this application, terms such as "first" and "second" are used only for description purposes, and cannot be understood as indicating or implying relative importance or implicitly indicating a quantity of indicated technical features.

In this application, unless otherwise clearly specified and limited, a term "connection" should be understood in a broad sense. For example, a "connection" may be a fixed connection, a detachable connection, or an integrated structure, may be a direct connection, or may be an indirect connection through an intermediary.

To make a person skilled in the art better understand the technical solutions of this application, the following first describes an implementation of an energy storage system to which this application is applied.

Figure 2:
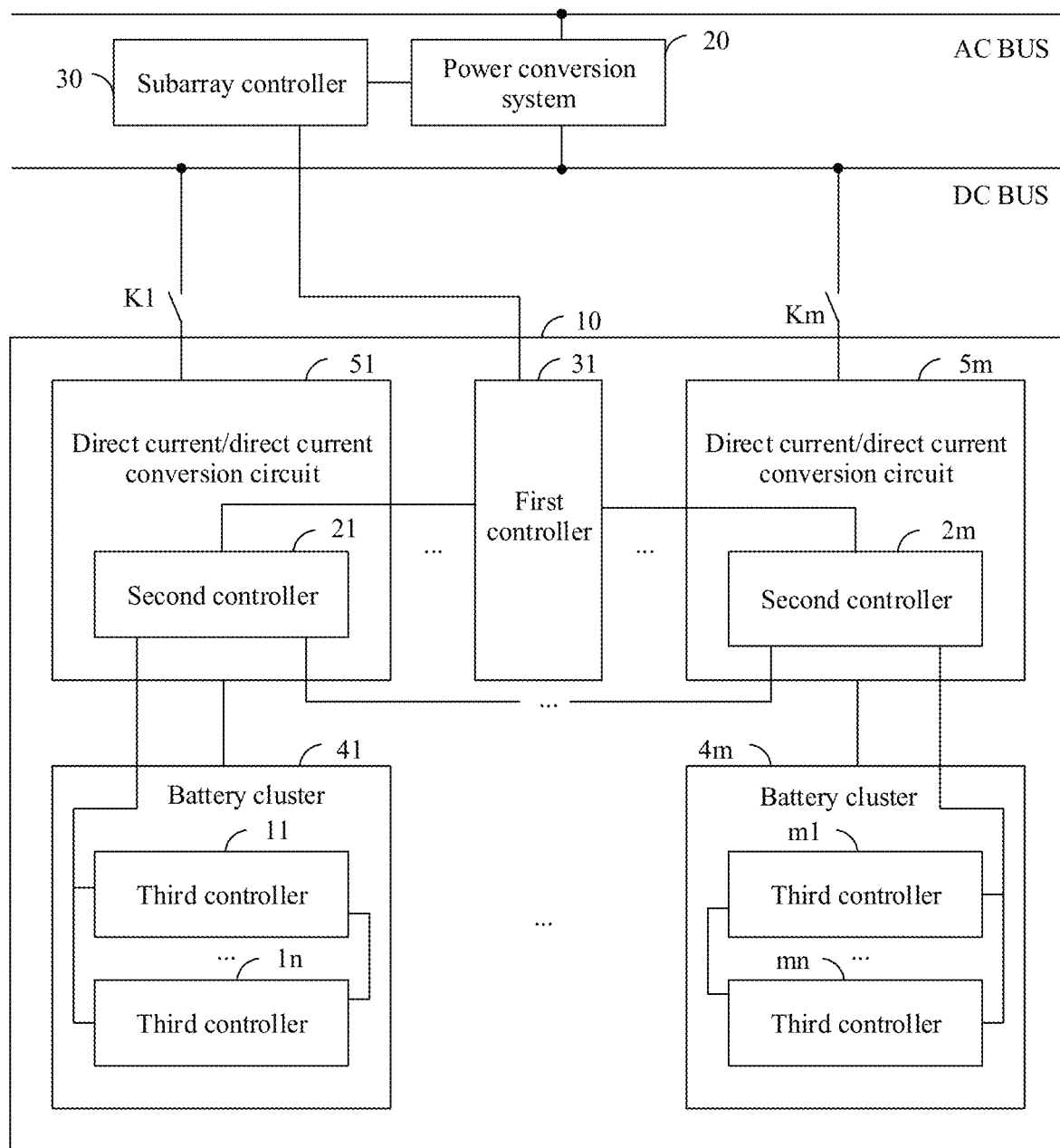
FIG. 2 is a schematic diagram of an energy storage system according to an embodiment of this application.

FIG. 2 is a schematic diagram of an energy storage system according to this application.

The illustrated energy storage system includes at least one energy storage container 10, and also includes a power conversion system (PCS) 20 and a subarray controller 30.

The figure shows only a scenario in which the energy storage system includes one energy storage container. Each energy storage container 10 includes m battery clusters, which are 41 to 4m in sequence, where m is an integer greater than 1.

Each battery cluster includes n battery packs connected in series, where n is an integer greater than 1. Therefore, m*n battery packs are included in each energy storage container 10. Each battery pack includes a plurality of batteries, and batteries in the battery pack may be connected in series or in series and parallel. This is not specifically limited in this embodiment of this application.

The battery may be a type such as a ternary lithium battery, a lead-acid battery, a lithium iron phosphate battery, a lithium titanate battery, a lead-carbon battery, a super capacitor, or a combination of the foregoing types. This is not specifically limited in this application.

One battery cluster is correspondingly connected to one direct current (DC)/direct current conversion circuit.

Each direct current/direct current conversion circuit is connected in series with circuit breakers, and is converged on the direct current bus (identified as DC BUS in the figure). The direct current bus includes a positive direct current bus and a negative direct current bus.

The circuit breakers in the figure are from K1 to Km. The circuit breakers are used to disconnect when a circuit is faulty to protect the energy storage system.

A first end of the power conversion system 20 is connected to the direct current bus, and a second end of the power conversion system 20 is connected to an alternating current (AC) bus (identified as AC BUS in the figure). The alternating current bus includes a first alternating current bus and a second alternating current bus. The energy storage system may include one or more power conversion systems 20.

The power conversion system 20 may select a neutral point clamped T-type three-level circuit, a neutral point clamped (NPC) circuit, an active neutral point clamped (ANPC) circuit, a flying capacitor multilevel circuit, and the like. This is not specifically limited in this embodiment of this application.

Each direct current/direct current conversion circuit is configured to implement bidirectional direct current conversion, that is, a direct current obtained from the direct current bus can be converted to charge a battery cluster, or a direct current output by a battery cluster can be converted to the direct current bus.

Similarly, the power conversion system 20 can implement bidirectional power conversion, that is, the power conversion system 20 can convert the direct current obtained from the direct current bus into an alternating current and then transmit the alternating current to the alternating current bus, or convert an alternating current obtained from the alternating current bus into a direct current and then transmit the direct current to the direct current bus.

A port voltage of a single battery changes with stored power amount, and a port output voltage of the battery cluster is an output voltage that fluctuates in a wide range. Therefore, to match with a port voltage variation range of the battery cluster, the direct current/direct current conversion circuit and the power conversion system usually have wide range of input and output capabilities.

A battery management system of the energy storage container 10 presents a three-layer structure. A first layer is a first controller 31, a second layer is second controllers 21 to 2m, and a third layer is third controllers 11 to 1n and m1 to mn.

One battery cluster includes n battery packs, and each battery pack corresponds to one third controller, that is, each third controller is configured to manage one corresponding battery pack. For a battery cluster 41, there are n third controllers corresponding to battery packs in the battery cluster 41, specifically the third controllers 11 to 1n. Similarly, for a battery cluster 4m, there are n third controllers corresponding to battery packs in the battery cluster 4m, specifically the third controllers m1 to mn.

Because the energy storage container 10 has m battery clusters in total, that is, battery clusters 41 to 4m, the energy storage container 10 has m*n battery packs in total, and correspondingly, m*n third controllers control the m*n battery packs one by one.

The third controller may implement passive power equalization at a battery level in the battery pack and automatic equalization at a battery pack level, and may further implement SOX estimation at the battery pack level, where the SOX includes at least one of a state of charge (SOC), a state of health (SOH), or a state of energy (SOE). The passive power equalization at the battery level in the battery pack may implement power equalization of each battery in the battery pack. The automatic equalization at the battery pack level may equalize power of a plurality of battery packs. In some embodiments, the third controller is a battery monitoring unit (BMU).

In one solution of this application, the n battery packs included in each battery cluster respectively corresponds to the third controllers connected in series.

A quantity of the second controllers is the same as a quantity of the battery clusters, and each second controller is configured to manage one corresponding battery cluster. The second controller may be connected to and communicate with third controllers corresponding to battery packs included in a corresponding battery cluster, generate a corresponding control instruction based on monitoring information of the battery packs sent by the third controllers, and then send the control instruction to the third controllers, to manage the battery cluster. As shown in FIG. 2, the energy storage container 10 includes the m battery clusters, specifically the battery clusters 41 to 4m, and correspondingly there are m second controllers, specifically the second controllers 21 to 2m. The second controller 21 is used as an example. The battery cluster 41 corresponding to the second controller 21 includes n battery packs, and each of the n battery packs corresponds to one third controller. The second controller 21 is connected to and communicates with the third controllers 11 to 1n, and the second controller 21 generates a corresponding control instruction based on monitoring information of each corresponding battery pack sent by one or more of the third controllers 11 to 1*n*, and then sends the control instruction to a corresponding third controller, to manage the battery cluster 41.

The second controllers can implement charge/discharge management of the battery cluster, power equalization between the battery clusters, SOX estimation at a battery cluster level, and a battery cluster protection policy. In some embodiments, the second controllers may be a battery control unit (BCU).

The first controller is configured to manage the entire energy storage container. In some embodiments, the first controller is a container monitoring unit (CMU).

The following first describes a manner of determining physical positions of the third controllers.

In this embodiment of this application, each second controller and third controllers respectively corresponding to the n battery packs in the corresponding battery cluster are connected through a controller area network (CAN) bus, so that data communication between a second controller and a third controller is strong in time validity. The third controllers corresponding to the n battery packs in each battery cluster are connected in series through the CAN bus.

A CAN bus can encode a communication data block. In this case, one third controller may be considered as one communication data block, that is, encoding of the third controllers respectively corresponding to the n battery packs in a same battery cluster is implemented. A corresponding physical position may be determined according to the encoding, which is described in the following with reference to the accompanying drawings.

Figure 3A:
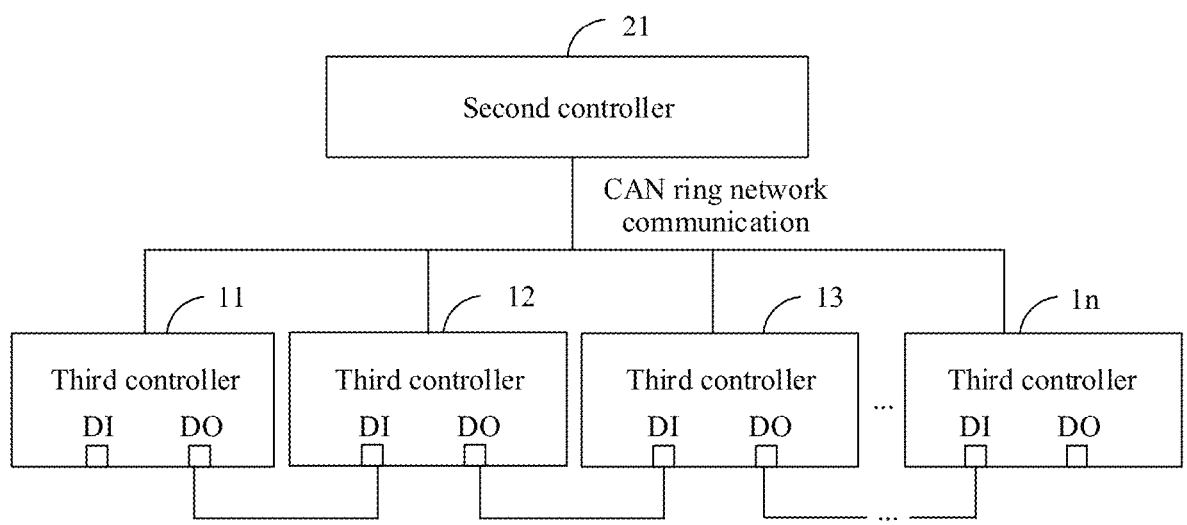
FIG. 3A is a schematic diagram 1 of CAN bus communication according to an embodiment of this application.

FIG. 3A is a schematic diagram 1 of CAN bus communication according to an embodiment of this application.

Determining physical positions of the third controllers corresponding to the battery packs in the battery cluster 41 is used as an example.

The second controller 21 is connected to third controllers 11 to 1*n* through the CAN bus, and each of the third controllers includes a digital signal input (DI) interface and a digital signal output (DO) interface. A DO interface of the third controller 11 is connected to a DI interface of the third controller 12, a DO interface of the third controller 12 is connected to a DI interface of the third controller 13, and so on. In this way, the third controllers 11 and 1*n* are connected in series.

Still refer to FIG. 3A. For n third controllers that are connected in series, a first third controller, that is, the third controller 11 is a first controller connected in series. After the first third controller connected in series is determined, a physical position of the first third controller is set to a first physical position. An $i^{th}$ third controller determines a physical position of the $i^{th}$ third controller based on a position signal sent by an $(i-1)^{th}$ third controller, where i=2, 3, . . . , or n. That is, the DO interface of the third controller 11 sends the position signal to the DI interface of the third controller 12. The DO interface of the third controller 12 sends the position signal to the DI interface of the third controller 13, and so on. The position signal is used to indicate a physical position of a next third controller connected in series, so that the next third controller determines the physical position of the next third controller based on the position signal sent by a previous third controller.

Specifically, except the third controller 11 and the third controller 1*n*, a position signal that is sent by a previous third controller and that is received by other third controllers is different from a position signal sent by the other third controllers to a next third controller. For example, a position signal that is sent by the third controller 11 and that is received by the third controller 12 is used to indicate a physical position of the third controller 11, and a position signal sent by the third controller 12 to the third controller 13 indicates a physical position of the third controller 13, that is, the two position signals are different.

A manner of determining the physical position of each second controller is described below.

In this embodiment of this application, the first controller and the m second controllers are connected through an Ethernet ring network, that is, the first controller and the m second controllers are used as nodes in the Ethernet ring network, to form a ring topology network.

Figure 3B:
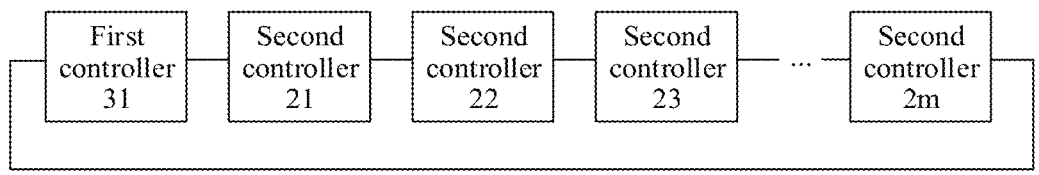
FIG. 3B is a schematic diagram of an Ethernet ring network connection according to an embodiment of this application.

As shown in FIG. 3B, the first controller 31 is connected to a first end of the second controller 21, a second end of the second controller 21 is connected to a first end of a second controller 22, a second end of the second controller 22 is connected to a first end of a second controller 23, and so on. Until a second end of the second controller 2*m* is connected to a second end of the first controller 31, the ring network connection is implemented.

The first controller 31 uses the RSTP when determining the physical position of each second controller.

A concept of the RSTP is a rapid spanning tree algorithm. Main functions of the RSTP include: finding and generating an optimal tree topology structure of a local area network which is a binary tree, discovering a topology fault and recovering the topology, automatically updating a network topology structure, and maintaining an optimal tree structure.

Nodes running the RSTP compare bridge information of the nodes with received information carried in a bridge protocol data unit (BPDU) sent by another bridge, and then uses the RSTP algorithm to cut a ring network to a tree network, where the tree network can represent a relative position of each node.

The Ethernet ring network using the RSTP includes a root bridge node, where the root bridge node is set as the first controller 31. This is because the energy storage container includes the first controller 31, and the physical position of the first controller 31 is determined. BPDU transmission rules on the ring network are as follows:

The root bridge transmits the BPDU downwards to inform each node of a shortest path.

The BPDU may not be transferred backward to an upper level.

The BPDU is transmitted only between two adjacent nodes.

The first controller 31 determines the binary tree according to the RSTP, and further determines relative positions between nodes in the Ethernet ring network, where the relative positions represent a connection relationship between the nodes in the Ethernet ring network. Then, the first controller 31 converts the relative positions into actual physical positions of the nodes according to the binary tree and a known physical position of any second controller, and further determine physical positions of remaining second controllers.

The figure shows only a scenario in which the energy storage system includes one energy storage container. When the energy storage system includes a plurality of energy storage containers, the subarray controller 30 is configured to communicate with the first controller 31 of each energy storage container and send a scheduling command to the first controller 31 of each energy storage container. This scheduling command is used to allocate power.

The first controller, the second controllers, the third controllers, the subarray controller, and the like in embodiments of this application may be application specific integrated circuits (ASIC), programmable logic devices (PLD), digital signal processors (DSP), or a combination thereof. The PLD may be a complex programmable logic device (CPLD), a field-programmable gate array (FPGA), a generic array logic (GAL), or any combination thereof. This is not specifically limited in this embodiment of this application.

It may be understood that the physical positions of the second controllers can be determined in the foregoing implementation, and the physical positions of third controllers corresponding to a second controller can be determined. It may be understood that, in actual application, only the physical positions of the second controllers may be determined. Alternatively, only physical positions of third controllers corresponding to a second controller are determined.

In conclusion, in the energy storage system provided in this embodiment of this application, when the physical position of each controller in the battery management system is identified, no hardware label needs to be set. Therefore, a misoperation is avoided, labor costs of management and maintenance are reduced, efficiency of physical position identification is improved, and security and reliability of the battery management system is improved.

The following provides a description with reference to specific implementations.

The following first describes a process of determining the physical positions of the third controllers.

Figure 4:
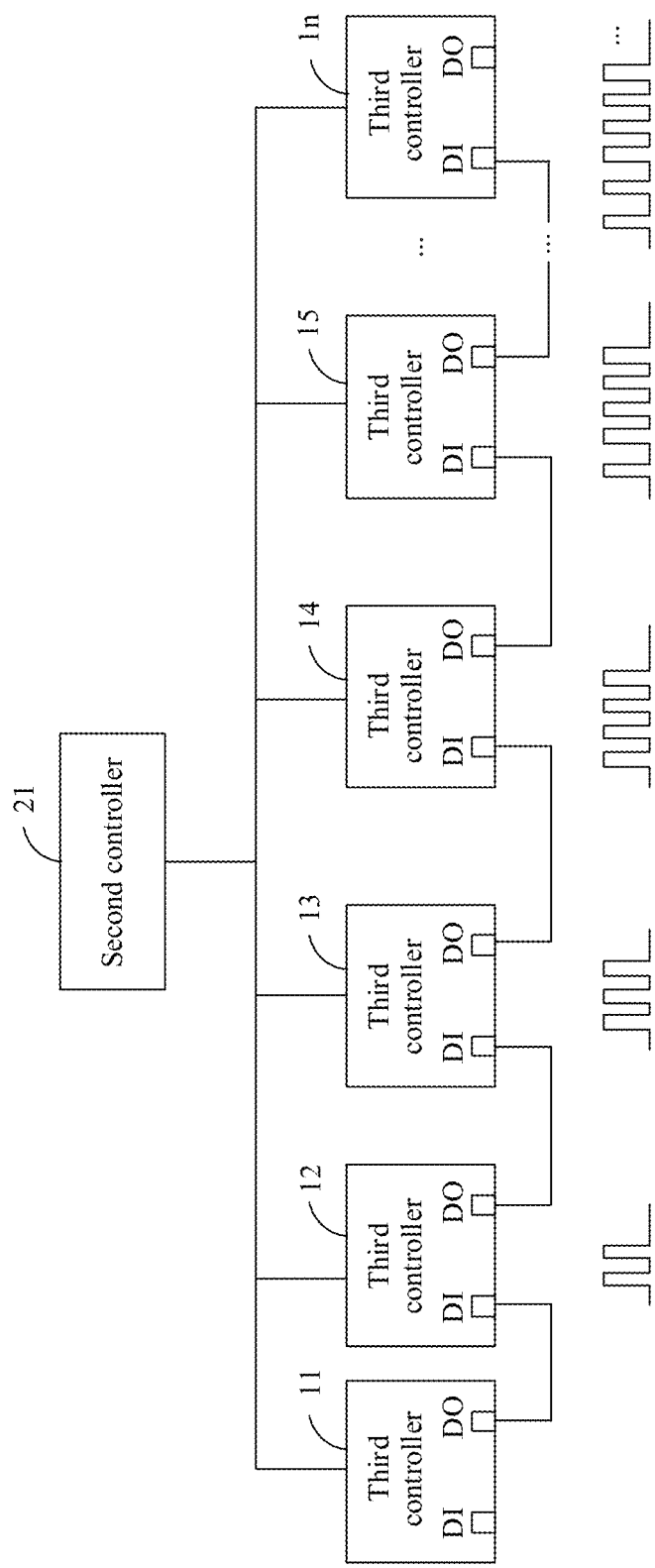
FIG. 4 is a schematic diagram 2 of CAN bus communication according to an embodiment of this application.

FIG. 4 is a schematic diagram 2 of CAN bus communication according to an embodiment of this application.

The physical position of the third controllers corresponding to the battery packs in the battery cluster 41 is still used as an example.

Each third controller is used as a communication data block in the CAN, and includes a DI interface and a DO interface. The third controllers are connected in series through the CAN bus. When the third controllers are connected in series, a DO interface of a previous third controller is connected to a DI interface of a next third controller. Finally, a DI interface of the third controller 11 is suspended, and a DO interface of the third controller 1n is suspended.

Each third controller in this embodiment of this application is configured as follows: When a DI interface of a third controller is suspended, the DI interface is at a high level, e.g., a high signal or voltage level, that is, the third controller detects the high level, and when a DI interface of a third controller is connected to a DO interface of a previous third controller, the DO interface is at a low level, that is, the third controller detects the low level.

After controllers of the battery management system are powered on, in some embodiments, a quantity of third controllers may be actively set. Specifically, the first controller 31 may support an external application program, for example, an application program (APP) of a mobile terminal, and set the quantity of third controllers by using the APP. In some other embodiments, with reference to FIG. 2, the subarray controller 30 generates, in response to input of a user, configuration information used to indicate the quantity of the third controllers, and then the subarray controller 30 sends the configuration information to the first controller 31, to further set the quantity of the third controllers. In still some embodiments, the quantity of the third controllers may be automatically identified through the CAN bus, that is, the quantity of the third controllers included in the CAN bus may be identified.

After each third controller is powered on, each third controller first detects a level of a DI interface of the third controller. When detecting that the DI interface of the third controller is a high level, the third controller determines that the third controller is the first controller connected in series, that is, the third controller is the third controller 11 in the figure. Then, the third controller sets the physical position of the third controller set as the first physical position. The third controller writes the first information representing the physical position of the third controller into a memory of the third controller.

The memory includes but is not limited to a phase change memory (PRAM), a static random access memory (SRAM), a dynamic random access memory (DRAM), another type of random access memory (RAM), an electrically erasable programmable read-only memory (EEPROM), or the like.

The third controller 11 then sends a position signal to the DO interface of the third controller 11, where the position signal is used to indicate a physical position of a next third controller connected in series, that is, a physical position of the third controller 12, and the position signal is transmitted to a DI interface of the next third controller.

The next third controller determines, based on the obtained position signal, that the next third controller is the third controller 12, and further determines, according to the first physical position, the physical position of the third controller 12, for example, determines that the physical position of the third controller 12 is a second physical position. The third controller 12 writes the first information representing the physical position of the third controller 12 into the memory. Then, the third controller 12 sends, to the DO interface of the third controller 12, a next third controller in a serial connection, that is, a position signal used to represent the physical position of the third controller 13, and the position signal is transmitted to a DI interface of the next third controller, i.e., the third controller 13.

By analogy, after determining the physical position of the third controller first in a serial connection-connected in series, each third controller stores the physical position of the third controller, and then sends a position signal used to indicate a next third controller in the serial connection, until the third controllers 12 to 1n connected in series all have determined physical positions. It may be understood that, when a third controller determines that the third controller is the third controller 1n and determines that the third controller is a last controller connected in series, the third controller no longer sends a position signal to the DO interface of next third controller.

In a possible implementation, the position signal is a pulse signal, and a quantity of pulses included in the pulse signal is used to indicate a physical position of a next third controller connected in series. After the physical position of the third controller 11 is determined, the third controller 11 sends, to the DO interface of the third controller 11, a position signal that carries two pulses, where the position signal is used to indicate that a next third controller connected in series is a second third controller connected in series, that is, the third controller 12.

The next third controller determines, based on the quantity of pulses in the obtained position signal, that is, determines that the next third controller is the second third controller connected in series, that is, determines that the next third controller is the third controller 12, and sends, to a DO interface of the next third controller, a position signal that carries three pulses, to represent that a next third controller connected in series is the third controller, that is, the third controller 13. By analogy, the quantity of pulses in the position signal is used to represent the physical position of the third controller. A position signal received by an $i^{th}$ third controller includes i pulses, where i=2, 3, . . . , or n.

The foregoing manner may be automatically performed after the battery management system is powered on, to implement automatic detection of a physical position. After the automatic detection starts, each third controller detects a level state of a DI interface of the third controller in real time, waits and continues detecting the level state of the DI interface when detecting that the DI interface is at a low level, and when detecting that the DI interface receives a pulse signal, the third controller determines a physical position of the third controller based on the received pulse signal, and writes first information representing the physical position of the third controller into the memory.

Each third controller may further send the first information to a second controller corresponding to a battery cluster in which the corresponding battery pack is located, so that the second controller determines a physical position of each third controller.

In some embodiments, when ground terminals of third controllers corresponding to n battery packs in a battery cluster are not connected to each other, for the n third controllers corresponding to the battery cluster, a DI interface of an $i^{th}$ third controller is connected to a DO interface of an $(i-1)^{th}$ third controller by using an optical coupler, that is, two adjacent third controllers are connected in series by using the optical coupler, to implement signal isolation output between the third controllers.

In conclusion, according to the solution provided in this embodiment of this application, after the battery management system is powered on, detection of the physical position of the third controller can be automatically implemented. Therefore, manual position distribution and detection are avoided, a misoperation is avoided, efficiency is improved, and security and reliability of the battery management system are improved.

The following describes an implementation in which the first controller determines a physical position of each second controller.

Figure 5:
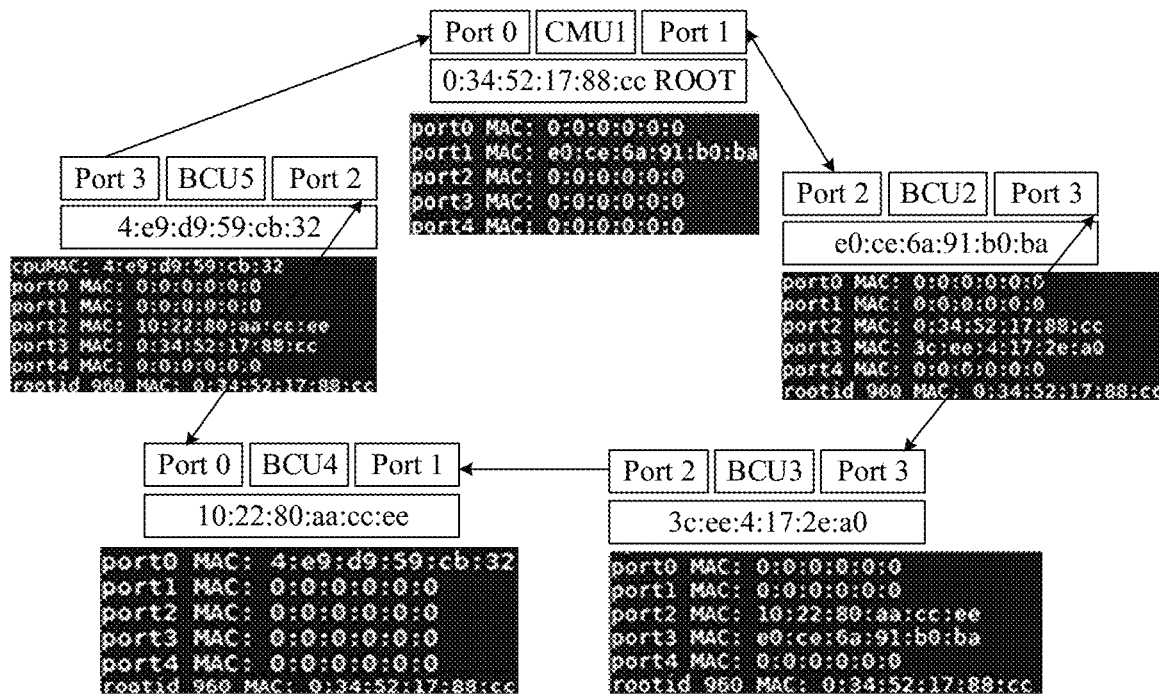
FIG. 5 is a schematic diagram of obtaining a ring network topology according to an RSTP according to an embodiment of this application.

FIG. 5 is a schematic diagram of obtaining a ring network topology according to an RSTP according to an embodiment of this application.

The first controller is connected with each second controller through an Ethernet ring network. In some embodiments, the first controller and each second controller are connected to each other through fast Ethernet (FE).

An RSTP-based ring network includes a root bridge node, and a principle of selecting the root bridge node is to preferentially select a node with a smallest bridge ID, and then select a node with a smallest media access control (MAC) address. However, because the energy storage container includes one first controller 31, and a physical position of the first controller 31 is determined, the first controller is set as a root bridge node in the solution of this embodiment of this application. If the bridge ID of the first controller is set to the first ID, and a bridge ID of the second controller is set to a second ID, the first ID is less than the second ID.

The following uses an example in which the Ethernet ring network includes the first controller (corresponding to a CMU1 in the figure) and four second controllers (corresponding to a BCU1 to a BCU4 in the figure) for description.

A bridge ID of the CMU1 is the smallest, and bridge IDs of BCU1 to BCU4 are all greater than the bridge ID of the CMU1. Each node controller includes five ports (port 0 to port 4). MAC addresses of the ports represent MAC addresses of node devices connected to the ports. For example, a MAC address of a port 1 of the CMU1 is e0:ce:6a:91:b0:ba, and it indicates that a MAC address of a controller connected to the port 1 of the CMU1 is e0:ce:6a:91:b0:ba.

According to a port connection relationship shown in the figure, a MAC address relationship table can be obtained as follows:

TABLE 1

| MAC address relationship table | | |
|---|---|---|
| Left node | The node | Right node |
| / | 1 | 2 |
| 1 | 2 | 3 |
| 2 | 3 | 4 |
| / | 4 | 5 |
| 4 | 5 | 1 |

In order to obtain a binary tree representing relative positions of the nodes, the following indexes a next node starting from the root bridge node:

The foregoing five nodes include one first controller and four second controllers, where the node 1 is the first controller.

In Table 1, an index node 1 is used as a position of the left node. It is found that the node 1 is a left node of the node 2. Therefore, the node 2 is a right node of the node 1.

Still in Table 1, an index node 2 is used as a position of the left node. It is found that the node 2 is a left node of the node 3. Therefore, the node 3 is a right node of the node 2.

Further, a position of the index node 3 as the left node in Table 1 cannot be found. Therefore, the ring network is disconnected at the node 3.

Similarly, in Table 1, the index node 1 is used as a position of the right node. It is found that the node 1 is a right node of the node 5. Therefore, the node 5 is the left node of the node 1.

Still in Table 1, an index node 5 is used as a right node. It is found that the node 5 is a right node of the node 4, and therefore, the node 4 is a left node of the node 5.

Still in Table 1, an index node 4 is used as a right node. It is found that the node 4 is a right node of the node 3.

The ring network is disconnected at the node 3. Still in Table 1, the index node 3 is used as the position of the right node. It is found that the node 3 is the right node of the node 2. Therefore, the node 2 is the left node of the node 3.

Still in Table 1, the index node 2 is used as the right node. It is found that the node 1 is the right node of the node 2. Therefore, the node 1 is the left node of the node 2.

Figure 6:
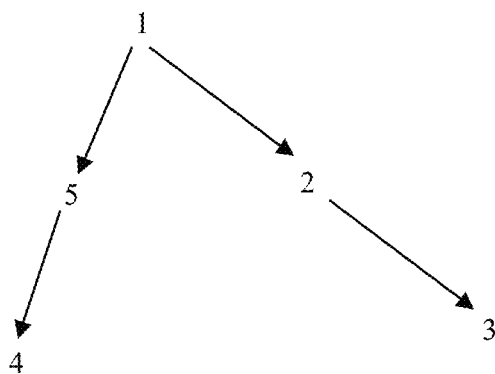
FIG. 6 is a schematic diagram of a binary tree corresponding to FIG. 5 according to an embodiment of this application.

FIG. 6 is a schematic diagram of a binary tree corresponding to FIG. 5 according to an embodiment of this application.

An optimal tree topology is generated according to the RSTP, which is a binary tree. In addition, based on the foregoing index process, a determined connection sequence of the nodes is 1→5→4→3→2→1, that is, the relative positions of the nodes are already determined.

In this case, after the physical position of any one of the node 1, the node 2, the node 3, and the node 4 is determined, the physical position of the remaining nodes may be determined with reference to the foregoing relative positions. The following uses an example for description:

It is still used as an example that the connection sequence of the nodes is 1→5→4→3→2→1. In this case, the node 1 is the first controller, and a physical position is determined. In the following, physical positions from the node 2 to the node 5 need to be determined, and the node 2 to the node 5 are four second controllers. It may be assumed that current physical positions of the second controllers are 12, 13, 14, and 15 successively. That is, the node 2 to the node 5 respectively occupy one of the four physical positions. If a currently known physical position of the node 5 corresponds to 12, it may be further determined, according to the foregoing determined connection sequence, that the physical position of the node 4 corresponds to 13, the physical position of the node 3 corresponds to 14, and the physical position of the node 2 corresponds to 15. Therefore, the physical positions of the seconds controller are identified.

When actual physical positions of the second controllers are determined based on the relative positions represented by the binary tree, a physical position of one second controller needs to be known. The following describes a method for determining a physical position of a second controller.

In some embodiments, an electrical connection may be added between the first controller and any second controller of the corresponding battery cluster, and an electrical connection manner may be RS-485 serial bus standard or input/output (I/O) connection manner. The first controller determines a physical position of the electrically connected second controller. In a possible implementation, the controller that is electrically connected is a second controller that is directly connected to the first controller, for example, a second controller represented by the node 5 or the node 2 in FIG. 6.

In some other embodiments, the memory of the first controller stores second information, and the second information represents a physical position of the second controller directly connected to the first controller. In this case, the first controller may determine, based on MAC addresses of two second controllers connected to the first controller, a physical position of one of the second controllers.

It may be understood that, when the physical positions of the second controllers are determined in the foregoing manner, a physical position of at least one of the second controllers needs to be known. Certainly, in actual application, physical positions of two or more second controllers may also be known.

The solution provided in this embodiment of this application may be automatically performed after the battery management system is powered on, so that the first controller implements automatic detection of the physical positions of the second controllers. Therefore, manual position distribution and detection are avoided, a misoperation is avoided, efficiency is improved, and security and reliability of the battery management system are improved.

Based on the energy storage system provided in the foregoing embodiment, an embodiment of this application further provides a physical position identification method of a battery management system of an energy storage system. The following specifically describes the method with reference to the accompanying drawings.

Figure 7:
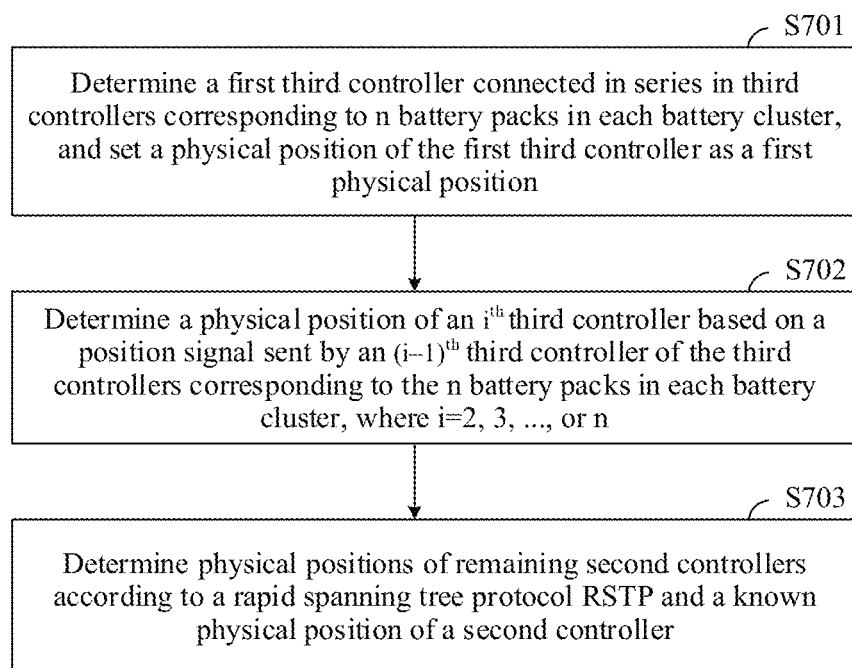
FIG. 7 is a flowchart of a physical position identification method of a battery management system of an energy storage system according to an embodiment of this application.

FIG. 7 is a flowchart of a physical position identification method of a battery management system of an energy storage system according to an embodiment of this application.

The method is applied to the energy storage system provided in the foregoing embodiments. For an implementation and a specific description of the energy storage system, refer to the foregoing embodiments. Details are not described herein again. The method includes the following steps:

S701: Determine a first third controller connected in series in third controllers corresponding to n battery packs in each battery cluster, and set a physical position of the first third controller as a first physical position.

In some embodiments, each third controller includes a DI interface and a DO interface.

In the third controllers corresponding to the n battery packs in each battery cluster, a DI interface of the first third controller is suspended, a DO interface of an $n^{th}$ third controller is suspended, and a DI interface of an $i^{th}$ third controller is connected to a DO interface of an $(i-1)^{th}$ third controller, where i=2, 3, . . . , or n.

When a DI interface of a third controller is suspended, the third controller is determined as the first third controller in n third controllers connected in series, and a physical position of the third controller is set as the first physical position.

S702: Determine a physical position of the $i^{th}$ third controller based on a position signal sent by the $(i-1)^{th}$ third controller of the third controllers corresponding to the n battery packs in each battery cluster, where i=2, 3, . . . , or n.

In some embodiments, the position signal is a pulse signal, and a quantity of pulses included in the pulse signal is used to indicate a physical position of a next third controller connected in series.

A previous third controller connected in series sends a position signal to a next third controller, and the next third controller determines a physical position of the next third controller based on the obtained position signal, to determine the physical positions of the third controllers. In this case, S702 may include the following steps:

S702a: The $i^{th}$ third controller in the third controllers corresponding to the n battery packs in each battery cluster is specifically configured to determine a physical position of the $i^{th}$ third controller based on a quantity of pulses included in a received position signal.

S702b: The $(i-1)^{th}$ third controller in the third controllers corresponding to then battery packs in each battery cluster is specifically configured to generate, based on a physical position of the $(i-1)^{th}$ third controller, a position signal used to indicate the physical position of the $i^{th}$ third controller, and send the position signal to the $i^{th}$ third controller.

In some embodiments, the following steps are further included:

S702c: Store first information representing the physical positions of the third controllers, and send the first information to second controllers corresponding to the battery cluster in which the corresponding battery packs are located.

According to the foregoing steps, automatic detection of the physical positions of the third controllers is implemented. Therefore, manual position distribution and detection are avoided, a misoperation is avoided, efficiency is improved, and security and reliability of the battery management system are improved.

S703: Determine physical positions of remaining second controllers according to a rapid spanning tree protocol (RSTP) and a known physical position of a second controller.

The energy storage container includes one first controller, that is, a physical position of the first controller is determined. The first controller is set as a root bridge node in the method in this embodiment of this application. If the bridge ID of the first controller is set to the first ID, and a bridge ID of the second controller is set to a second ID, the first ID is less than the second ID.

S703 includes:

S703a: Determine, according to the RSTP, relative positions of the second controllers of a corresponding to battery cluster.

S703b: Determine, based on a known physical position of a second controller and the relative positions, the physical positions of the second controllers of the corresponding battery cluster.

To obtain a physical position of a second controller, in some embodiments, an electrical connection may be added between the first controller and any second controller of the corresponding battery cluster, and an electrical connection manner may be RS-485 serial bus standard or input/output connection manner. The first controller determines a physical position of the second controller that is electrically connected. In a possible implementation, the controller that is electrically connected is a second controller that is directly connected to the first controller.

In some other embodiments, a memory of the first controller stores second information, and the second information represents a physical position of the second controller directly connected to the first controller. In this case, the first controller may determine, based on MAC addresses of two second controllers connected to the first controller, a physical position of one of the second controllers.

It may be understood that, when the physical positions of the second controllers are determined in the foregoing manner, a physical position of at least one of the second controllers needs to be known. Certainly, in actual application, physical positions of two or more second controllers may also be known.

The foregoing step division and sequence in embodiments of this application are merely for ease of description, and do not constitute a limitation on the technical solutions of this application.

The foregoing S701 to S703 may simultaneously determine physical positions of the second controllers and the third controllers of the battery management system. In actual application, when only the physical positions of the second controllers need to be determined, only S703 may be performed. When only the physical positions of the third controllers corresponding to a second controller need to be determined, only S701 to S702 may be performed.

In some other embodiments, if a physical position of one third controller needs to be directly determined but a second controller corresponding to the third controller is not determined, a physical position of the second controller corresponding to the third controller may be first determined by performing S701 to S702. Then, the physical position corresponding to the third controller is determined by performing S703, so that the third controller can be accurately located.

In conclusion, according to the method provided in this embodiment of this application, the third controllers corresponding to the n battery packs in one battery cluster are connected in series, the physical position of the first third controller connected in series is determined, and the physical position of the first third controller is set as the first physical position. The previous third controller connected in series sends the position signal to the next third controller, and the next third controller determines its own physical position based on the obtained position signal. The first controller is connected to the m second controllers through the Ethernet ring network. The first controller determines, according to the RSTP, the binary tree representing the relative positions of the second controllers. Then, with reference to a known physical position of any second controller, the first controller determines the physical positions of the remaining second controllers. In solutions of this application, a hardware label does not need to be set, and a misoperation can be avoided when a physical position of a controller is identified, efficiency is improved, and security and reliability of the battery management system are improved.

An embodiment of this application further provides a photovoltaic power generation system, which is described below with reference to accompanying drawings.

Figure 8:
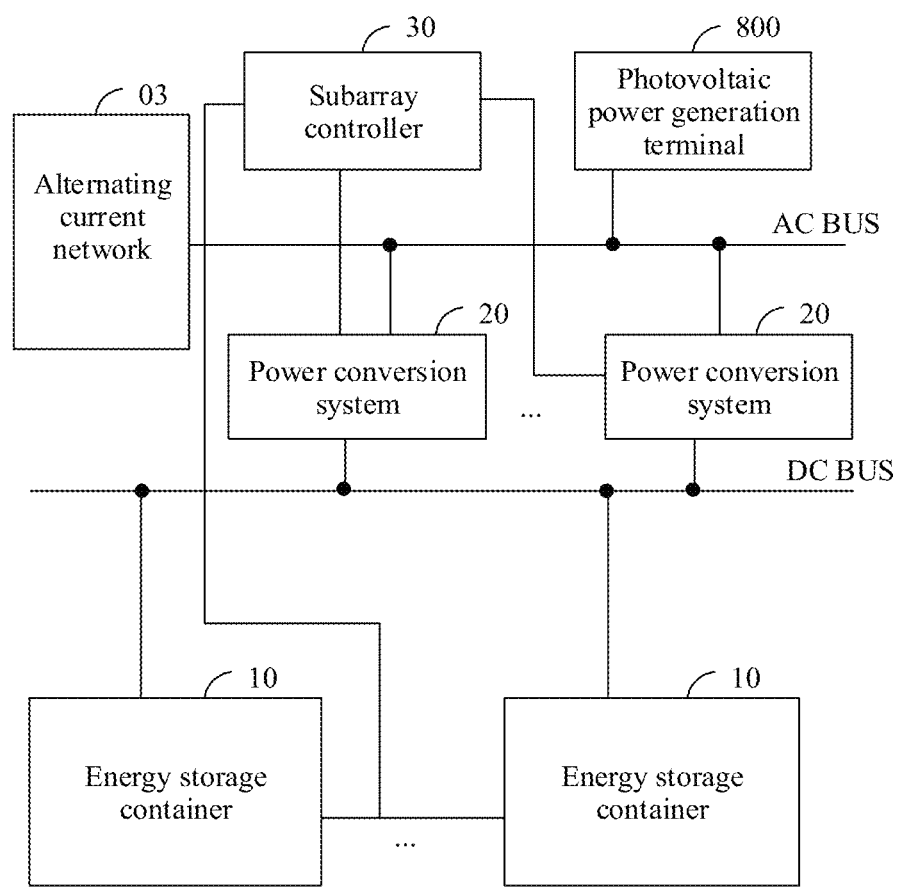
FIG. 8 is a schematic diagram of a photovoltaic power generation system according to an embodiment of this application.

FIG. 8 is a schematic diagram of a photovoltaic power generation system according to an embodiment of this application.

The photovoltaic power generation system in the figure includes an energy storage system, an alternating current bus, and a photovoltaic power generation terminal 800.

The alternating current bus (identified as AC BUS in the figure) includes a first alternating current bus and a second alternating current bus.

The energy storage system includes at least one energy storage container 10, at least one power conversion system (PCS) 20, and a direct current bus (identified as DC BUS in the figure).

The direct current bus includes a positive direct current bus and a negative direct current bus.

For a specific implementation of the energy storage container 10, refer to related descriptions in the foregoing embodiments. Details are not described herein again. A first end of the power conversion system 20 is connected to the direct current bus, and a second end of the power conversion system 20 is connected to the alternating current bus. The power conversion system 20 can implement bidirectional power conversion, that is, the power conversion system can convert a direct current obtained from the direct current bus into an alternating current and then transmit the alternating current to the alternating current bus, or convert an alternating current obtained from the alternating current bus into a direct current and then transmit the direct current to the direct current bus.

In some embodiments, one energy storage container 10 and one power conversion system 20 are connected to form one energy storage branch, and the energy storage system includes at least one energy storage branch.

In some other embodiments, a quantity of energy storage containers 10 and a quantity of power conversion systems 20 are different.

Figure 9:
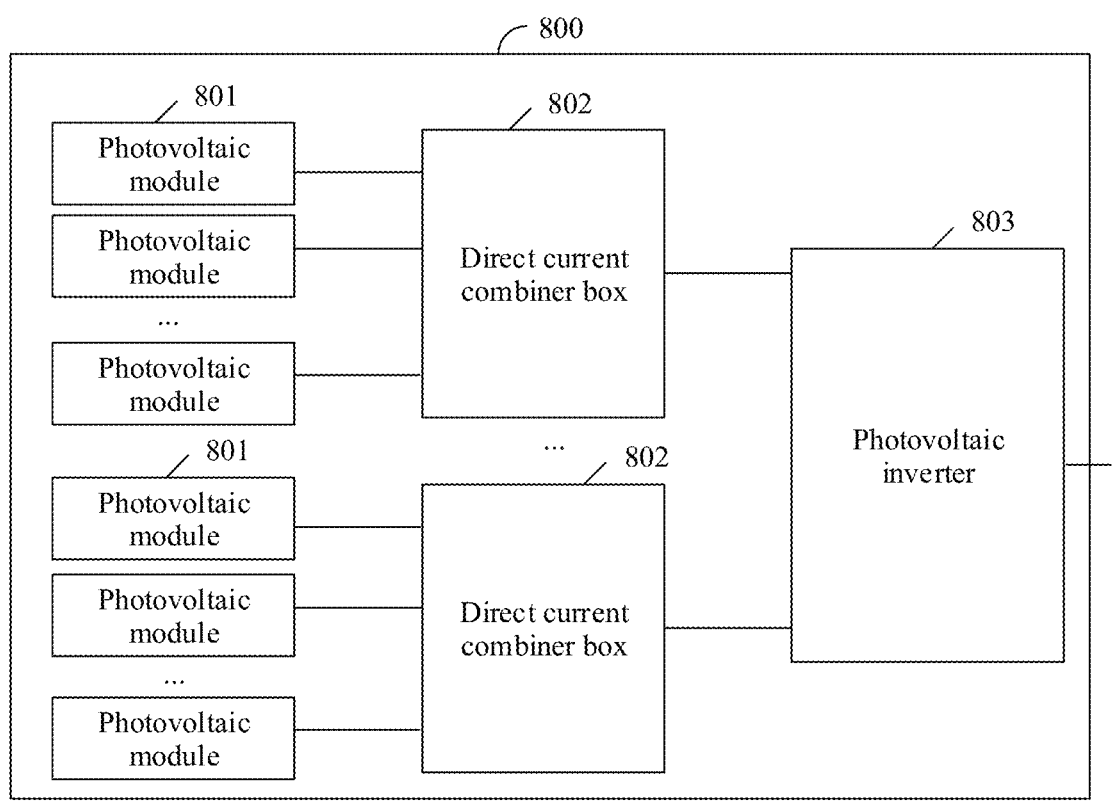
FIG. 9 is a schematic diagram of a photovoltaic power generation terminal according to an embodiment of this application.

FIG. 9 is a schematic diagram of a photovoltaic power generation terminal according to an embodiment of this application.

The photovoltaic power generation terminal 800 in the figure includes a photovoltaic module 801, a direct current combiner box 802, and a photovoltaic inverter 803.

The photovoltaic module 801 is configured to generate a direct current by using light energy. An input end of the direct current combiner box 802 is usually connected to a plurality of photovoltaic modules 801, and an output end of the direct current combiner box 802 is connected to the photovoltaic inverter 803.

An output end of the photovoltaic inverter 803 is connected to the alternating current bus. The alternating current bus also connects an energy storage system to an alternating current network. The photovoltaic inverter 803 is configured to convert a direct current into an alternating current, and transmit the alternating current to the power network through the alternating current bus, or charge the energy storage system.

Figure 10:
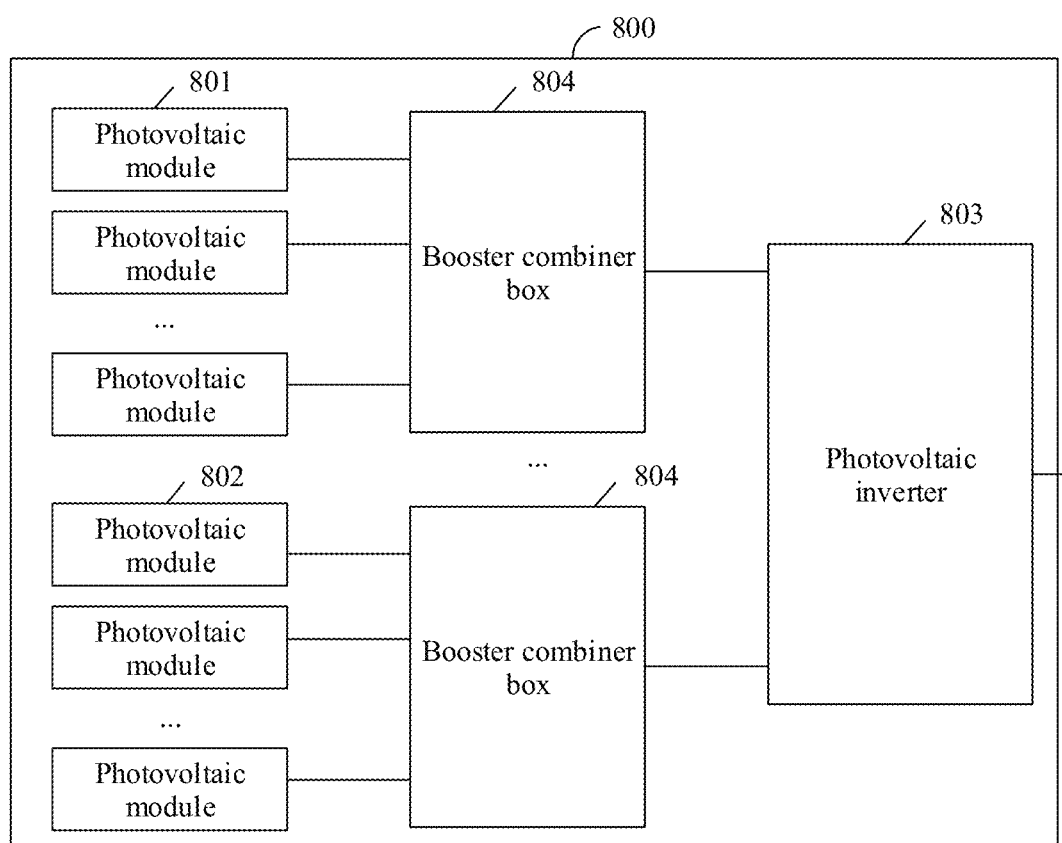
FIG. 10 is a schematic diagram of another photovoltaic power generation terminal according to an embodiment of this application.

FIG. 10 is a schematic diagram of another photovoltaic power generation terminal according to an embodiment of this application.

A difference between the photovoltaic power generation system shown in FIG. 10 and the photovoltaic power generation system FIG. 9 lies in that the photovoltaic module 801 first outputs a direct current to a booster combiner box 804. The booster combiner box 804 has a maximum power point tracking (MPPT) function, and is a direct current booster converter.

In actual application, there may be one or more three-phase photovoltaic inverters 803 in the scenarios in FIG. 9 and FIG. 10. This is not specifically limited in this embodiment of this application.

Because the demand on the photovoltaic power generation terminal 800 is characterized by volatility and uncertainty, the amount of power generated by the terminal 800 fluctuates. When an alternating current output by the photovoltaic power generation terminal 800 is higher than the power demand of an alternating current network 03, the excess power charges a battery cluster in the energy storage system through the alternating current bus. When the alternating current output by the photovoltaic power generation terminal 800 is lower than the power demand of the alternating current network 03, the battery cluster in the energy storage system outputs a direct current, and the direct current is converted into an alternating current by using a power conversion system 200 of the energy storage system and then output to the alternating current network 03, so that the power input into the alternating current network 03 becomes stable.

In a battery management system of the energy storage system of the photovoltaic power generation system, third controllers corresponding to n battery packs in a battery cluster are connected in series, a first third controller connected in series is determined, and a physical position of the first third controller is set to a first physical position. A previous third controller connected in series sends a position signal to a next third controller, and the next third controller determines a physical position of the next third controller based on the obtained position signal, to determine a physical position of a third controller. A first controller is connected to m second controllers through an Ethernet ring network. The first controller determines, according to an RSTP, a binary tree representing relative positions of second controllers. Then, the first controller determines physical positions of remaining second controllers with reference to a known physical position of any second controller. In the solution of this application, a hardware label does not need to be set, and a misoperation is avoided when a physical position of a controller is identified, efficiency is improved, and security and reliability of the battery management system are improved.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally represents an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

Embodiments in this specification are all described in a progressive manner, for same or similar parts in embodiments, refer to these embodiments, and each embodiment focuses on a difference from other embodiments. In addition, some or all of the units and modules may be selected depending on actual requirements, to achieve objectives of the solutions of the embodiments. A person of ordinary skill in the art may understand and implement embodiments without creative efforts.

The foregoing descriptions are merely specific implementations of this application. It should be noted that a person of ordinary skill in the art may make several improvements or polishing without departing from the principle of this application and the improvements or polishing shall fall within the protection scope of this application.

What is claimed is:

1. An energy storage system, wherein the energy storage system comprises a battery management system and m battery clusters;
    each battery cluster comprises n battery packs connected in series, and the battery management system comprises a first controller, m second controllers, and m*n third controllers, wherein m and n are integers greater than 1;
    each second controller is connected with third controllers corresponding to the n battery packs in the corresponding battery cluster, and the third controllers corresponding to the n battery packs in each battery cluster are connected; wherein each third controller comprises a digital signal input (DI) interface and a digital signal output (DO) interface; when the third controllers corresponding to the n battery packs in each battery cluster are connected in series, a DI interface of a $1^{th}$ third controller is suspended, a DO interface of an $n^{th}$ third controller is suspended, and a DI interface of an $i^{th}$ third controller is connected to a DO interface of an $(i-1)^{th}$ third controller;
    the first controller is configured to manage the energy storage system, each second controller is configured to manage one corresponding battery cluster, and each third controller is configured to manage one corresponding battery pack; and
    the third controllers corresponding to the n battery packs in each battery cluster are configured to determine a physical position of the $1^{th}$ third controller, and the $i^{th}$ third controller in the third controllers corresponding to the n battery packs in each battery cluster determines a physical position of the $i^{th}$ third controller based on a position signal sent by an $(i-1)^{th}$ third controller, wherein i=2, 3, . . . , or n.

2. The energy storage system according to claim 1, wherein the first controller is connected to the m second controllers through an Ethernet ring network; and
    the first controller is configured to determine physical positions of remaining second controllers according to a rapid spanning tree protocol (RSTP) and a known physical position of a second controller.

3. The energy storage system according to claim 2, wherein the first controller is a root bridge node, a bridge ID of the first controller is a first ID, a bridge ID of the second controller is a second ID, and the second ID is greater than the first ID.

4. The energy storage system according to claim 3, wherein the first controller is configured to determine relative positions of the second controllers in the Ethernet ring network according to the RSTP, and determine physical positions of remaining second controllers in the Ethernet ring network based on a known physical position and a relative position of a second controller.

5. The energy storage system according to claim 4, wherein the first controller and a second controller in the corresponding battery cluster are electrically connected in one of the following manners:
- an RS-485 serial bus standard or input/output connection manner; and
- the first controller is further configured to determine a physical position of the second controller that is electrically connected.

6. The energy storage system according to claim 4, wherein the first controller stores second information, and the second information represents a physical position of the second controller directly connected to the first controller.

7. The energy storage system according to claim 1, wherein when determining that a DI interface of the third controller is suspended, the third controller determines that the third controller is the $1^{th}$ third controller.

8. The energy storage system according to claim 7, wherein the third controller is further configured to store first information representing the physical position of the third controller, and send the first information to a second controller in a battery cluster in which a corresponding battery pack is located.

9. The energy storage system according to claim 1, wherein the position signal is a pulse signal;
- the $(i-1)^{th}$ third controller in the third controllers corresponding to the n battery packs in each battery cluster is configured to determine a quantity of pulses in the position signal based on a physical position of the $(i-1)^{th}$ third controller, to generate the position signal used to indicate the physical position of the $i^{th}$ third controller, and send the position signal to the $i^{th}$ third controller; and
- the $i^{th}$ third controller in the third controllers corresponding to the n battery packs in each battery cluster is specifically configured to determine the physical position of the $i^{th}$ third controller based on the quantity of pulses comprised in the received position signal.

10. The energy storage system according to claim 1, wherein ground terminals of the third controllers corresponding to the n battery packs in each battery cluster are not connected to each other, and the DI interface of the $i^{th}$ third controller is connected to the DO interface of the $(i-1)^{th}$ third controller by using an optical coupler.

11. A battery pack, wherein the battery pack comprises a controller, wherein the controller is configured to:
- determine a physical position of the controller based on a first position signal sent by a previous controller; and
- send a second position signal to a next controller, the second position signal is used to indicate a physical position of the next controller;
- wherein the physical position of the controller comprises a node position in a binary tree according to a rapid spanning tree protocol (RSTP).

12. The battery pack according to claim 11, wherein the controller comprises a digital signal input (DI) interface and a digital signal output (DO) interface; the DI interface of the controller is connected to a DO interface of the previous controller, the DO interface of the controller is connected to a DI interface of the next controller.

13. The battery pack according to claim 11, wherein the position signal is a pulse signal;
- the controller is configured to determine a quantity of pulses in the second position signal based on the physical position of the controller, to generate the second position signal, and send the second position signal to the next controller; and
- the controller is configured to determine the physical position of the controller based on the quantity of pulses comprised in the first position signal.

14. The battery pack according to claim 13, wherein the controller is further configured to store first information representing the physical position of the controller, and send the first information to a second controller in a battery cluster in which a corresponding battery pack is located.

* * * * *